(12) United States Patent
Popli (10) Patent No.: US 12,001,402 B2
(45) Date of Patent: Jun. 4, 2024

(54) DYNAMICALLY SELECTING AN APPLICATION TO OPEN A FILE

(71) Applicant: Dell Products L.P., Round Rock, TX (US)

(72) Inventor: Sumit Popli, Campbell, CA (US)

(73) Assignee: Dell Products L.P., Round Rock, TX (US)

( * ) Notice: Subject to any disclaimer, the term of this patent is extended or adjusted under 35 U.S.C. 154(b) by 357 days.

(21) Appl. No.: 17/391,511

(22) Filed: Aug. 2, 2021

(65) Prior Publication Data
US 2023/0035500 A1 Feb. 2, 2023

(51) Int. Cl.
*G06F 16/182* (2019.01)
*G06F 16/17* (2019.01)

(52) U.S. Cl.
CPC ...... *G06F 16/1824* (2019.01); *G06F 16/1734* (2019.01)

(58) Field of Classification Search
CPC ....... G06F 16/182–183; G06F 16/1734; G06F 16/1824
USPC ...................................................... 707/704
See application file for complete search history.

(56) References Cited

U.S. PATENT DOCUMENTS

| | | | | |
|---|---|---|---|---|
| 7,409,405 | B1* | 8/2008 | Masinter | G06F 9/445 707/999.102 |
| 9,852,292 | B2* | 12/2017 | Thomas | G06F 21/62 |
| 2006/0036570 | A1* | 2/2006 | Schaefer | G06F 21/6281 |
| 2006/0059174 | A1* | 3/2006 | Mese | G06F 9/445 |
| 2009/0171917 | A1* | 7/2009 | Chou | G06F 16/10 |
| 2013/0067600 | A1* | 3/2013 | Graham | G06F 21/335 726/30 |
| 2014/0108465 | A1* | 4/2014 | Chang | G06F 16/1847 707/802 |
| 2015/0199196 | A1* | 7/2015 | Cairns | G06F 9/44505 717/120 |
| 2016/0085765 | A1* | 3/2016 | Verma | G06F 16/182 707/827 |
| 2016/0127452 | A1* | 5/2016 | Newman | G06F 21/31 709/203 |
| 2016/0147722 | A1* | 5/2016 | Hariharan | G06F 40/143 715/255 |

(Continued)

FOREIGN PATENT DOCUMENTS

WO WO 2006/039239 A1 * 4/2006 ............... G06F 9/46

OTHER PUBLICATIONS

Guo, Philip J., et al., "CDE: Using System Call Interposition to Automatically Create Portable Packages", 2011 USENIX Annual Technical Conference, Portland, OR, Jun. 15-17, 2011, 6 pages.*

(Continued)

*Primary Examiner* — Robert Stevens
(74) *Attorney, Agent, or Firm* — Kirton McConkie; Brian Tucker (57) ABSTRACT

An application can be dynamically selected to open a file. An application broker service can be configured to received intercepted requests to open files. The application broker service can process the intercepted requests to determine a type and location of the files to be opened. Using the type and the location of the files to be opened, the application broker service can select applications to open the files. If a file fails to open in a selected application, the application broker service can select another application to open the file.

20 Claims, 6 Drawing Sheets

(56) References Cited

U.S. PATENT DOCUMENTS

| | | | | |
|---|---|---|---|---|
| 2018/0146029 A1* | 5/2018 | Newman | ............... | G06F 21/629 |
| 2018/0173575 A1* | 6/2018 | Leibovici | ................ | G06F 16/16 |
| 2019/0102405 A1* | 4/2019 | Yang | .................... | G06F 3/0619 |
| 2019/0260836 A1* | 8/2019 | Zahl | ...................... | H04L 63/102 |
| 2019/0370034 A1* | 12/2019 | Goodman | ............ | G06F 3/0673 |
| 2020/0007654 A1* | 1/2020 | Tyebkhan | ................ | G06F 8/71 |
| 2021/0224231 A1* | 7/2021 | Xie | .................... | G06F 16/1734 |

OTHER PUBLICATIONS

Goglin, Brice, et al., "Design and Implementation of ORFA", Technical Report TR2003-01, LIP, ENS Lyon, Lyon, France, Sep. 2003, 15 pages.*

* cited by examiner

FIG. 1

| Installed Applications | File Extensions | Application Location | Application Type | Preferred |
|---|---|---|---|---|
| Word 2016 | .docx<br>.doc<br>... | C:\Program Files\Microsoft Office\Office16\winword.exe | Local | - |
| Office 365 Word | .docx<br>.doc<br>... | https://[path to Office 365 Word] | Cloud | .docx files stored in cloud |
| Word Published App | .docx<br>.doc<br>... | C:\[Path to VDI app] | VDI | .docx files stored locally |
| Adobe Acrobat DC | .pdf<br>... | "C:\Program Files (x86)\Adobe\Acrobat DC\Acrobat\Acrobat.exe | Local | .pdf |

DYNAMICALLY SELECTING AN APPLICATION TO OPEN A FILE

CROSS-REFERENCE TO RELATED APPLICATIONS

N/A

BACKGROUND

A user can open a file on a computing device in a variety of ways. For example, users typically open a file by double clicking on its icon in a file explorer or on the desktop. Users may also open a file by selecting an open option in a pop-up menu (e.g., by right clicking on the file's icon to display the menu), by using a command line interface (e.g., by inputting the file's name) or by other techniques.

When a user requests that a file be opened, the operating system will typically identify the file's extension and determine which application is registered to open files having that extension. In other words, whenever the user attempts to open a file having a particular extension, the operating system will launch the default application defined for the particular extension and cause the default application to attempt to open the file (e.g., by passing the path and name of the file as an argument when invoking the default application). If a default application is not defined, the operating system may prompt the user to pick an application that should be launched to open the file. If a default application is defined but fails to load or cannot handle the extension for which it is the default application, the file open will fail.

BRIEF SUMMARY

The present invention extends to methods, systems, and computer program products for dynamically selecting an application to open a file. An application broker service can be configured to received intercepted requests to open files. The application broker service can process the intercepted requests to determine a type and a location of the files to be opened. Using the type and the location of the files to be opened, the application broker service can select applications to open the files. If a file fails to open in a selected application, the application broker service can select another application to open the file.

In some embodiments, the present invention may be implemented as a method for dynamically selecting an application to open a file. A request to open a file on a computing device can be intercepted. An application to open the file can be selected based on a location of the file. The selected application can then be invoked to open the file.

In some embodiments, the present invention may be implemented as a method for dynamically selecting an application to open a file. A request to open a file on a computing device may be intercepted. A first application may be selected to open the file. The first application may then be invoked to open the file. It can be detected that the file failed to open in the first application. A second application may then be selected to open the file. The second application may be invoked to open the file.

In some embodiments, the present invention may be implemented as computer storage media storing computer executable instructions which when executed implement a method for dynamically selecting an application to open a file. The method may include: intercepting a request to open a file on a computing device; selecting an application to open the file based on a location of the file; and launching the selected application to open the file.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Embodiments of the present invention will be described primarily using Windows-based examples. However, the described techniques and functionality can equally be implemented in other operating system environments such as Linux.

Figure 1:
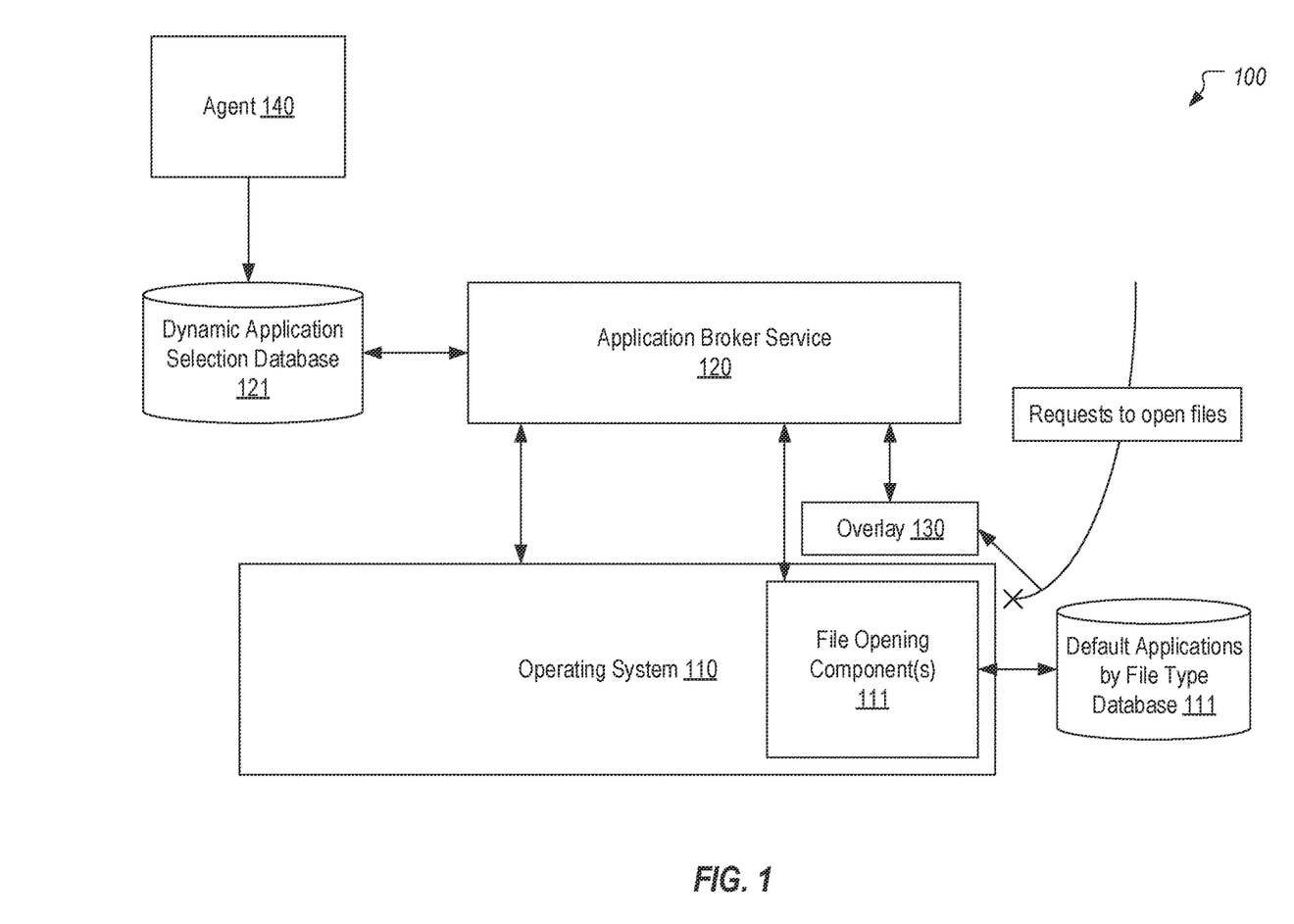
FIG. 1 illustrates an example architecture that can be employed to implement one or more embodiments of the present invention.

FIG. 1 provides an example of various components that may be employed on a computing device 100 to implement one or more embodiments of the present invention. As shown, computing device 100 includes an operating system 110 having a file opening component (or components) 111. File opening component 111 is intended to generally represent functionality or a portion of operating system 110 that handles user requests to open files. The nature of file opening component 111 is dependent on the nature of overlay 130 as described below. Therefore, embodiments of the present invention should not be limited to any example used in the figures.

As mentioned in the background, file opening component 111 may be, but need not be, configured to use a default applications by file type database 111 as part of handling user requests to open files. As one example only, when operating system 110 is the Windows operating system, file opening component 111 could be configured to identify the extension of the file that the user has requested to be opened, access default applications by file type database 111 to identify the default application for the extension and then cause the default application to be loaded such as by calling the CreateProcess function and specifying the default application's executable and the name/path of the file to be opened. For example, if the user double clicked on the file "C:\Users\User1\Desktop\document.docx" and Microsoft Word was defined as the default application for files having the .docx extension, file opening component 111 (which could be explorer.exe) could call some version of the CreateProcess function and specify "C:\Program Files\Microsoft Office\Office16\winword.exe" and "C:\Users\User1\Desktop\document.docx" as arguments. As a result, Microsoft Word would be launched and would be passed the file path/name so that it would open the file.

In accordance with embodiments of the present invention, an application broker service 120 and an overlay 130 may be employed on computing device 100 to cause an application to be dynamically selected when a user requests that a file be opened. Application broker service 120 can maintain and use dynamic application selection database 121 for this purpose. In some embodiments, an agent 140 may also be employed on computing device 100 to enable dynamic application selection database 121 to be updated or configured remotely.

As an overview, overlay 130 can be configured to detect requests to open files and can intercept such requests and redirect them to application broker service 120. Application broker service 120 can use dynamic application selection database 121 to select an application to open the file. Application broker service 120 can then interface with operating system 110 to cause the selected application, as opposed to any application specified in the intercepted request to open the file, to be used to open the file. In this way, application broker service 120 can ensure that there will be no failure to open the file and that the selected application is a preferred/best application for opening the file. Notably, application broker service 120 can implement this functionality to enable a variety of types of applications to be used to open files including local applications, virtual desktop infrastructure (VDI) applications and cloud applications.

Overlay 130 can be configured in a variety of ways to enable it to intercept requests to open files. For example, overlay 130 could be implemented by hooking API calls to the ProcessCreate function or another function that is invoked when a process is created for an application that is to be loaded to open a file. In such cases, overlay 130 could examine calls to the ProcessCreate function to determine if they specify a file that is to be opened by the specified application (e.g., if the 1pCommandLine parameter specifies a file name/path). As another example, overlay 130 could be implemented as a file system filter driver that inspects I/O control codes (IOCTLs) to identify those pertaining to a request to launch an application to open a file. As a further example, overlay 130 could be configured to intercept or detect user interactions indicative of a request to open a file (e.g., detecting double click events that are delivered to explorer.exe). Notably, in typical implementations of embodiments of the present invention, overlay 130 may be configured to intercept only requests to open files that are part of a request to launch an application (e.g., when the operating system attempts to load Microsoft Word to open a .docx file that the user clicked on) as opposed to a request of an already-running application to open a file within the application (e.g., when Microsoft Word attempts to open a .docx file that the user selected within a menu of Microsoft Word). However, in some embodiments, overlay 130 could be configured to intercept all requests to open files.

As represented in FIG. 1, because overlay 130 intercepts requests to open files, such requests will not be completed by file opening component 111 (at least without first being processed by application broker service 120). Therefore, even if a default application is defined for the type of file that a request identifies, overlay 130 will prevent file opening component 111 from launching the default application to open the file. For example, if default applications by file type database 111 defines the locally installed Microsoft Word (winword.exe) as the default application for any .docx file, overlay 130 will prevent, at least initially, the loading of the locally installed Microsoft Word to open any .docx file that the user may request to be opened.

Figure 2:
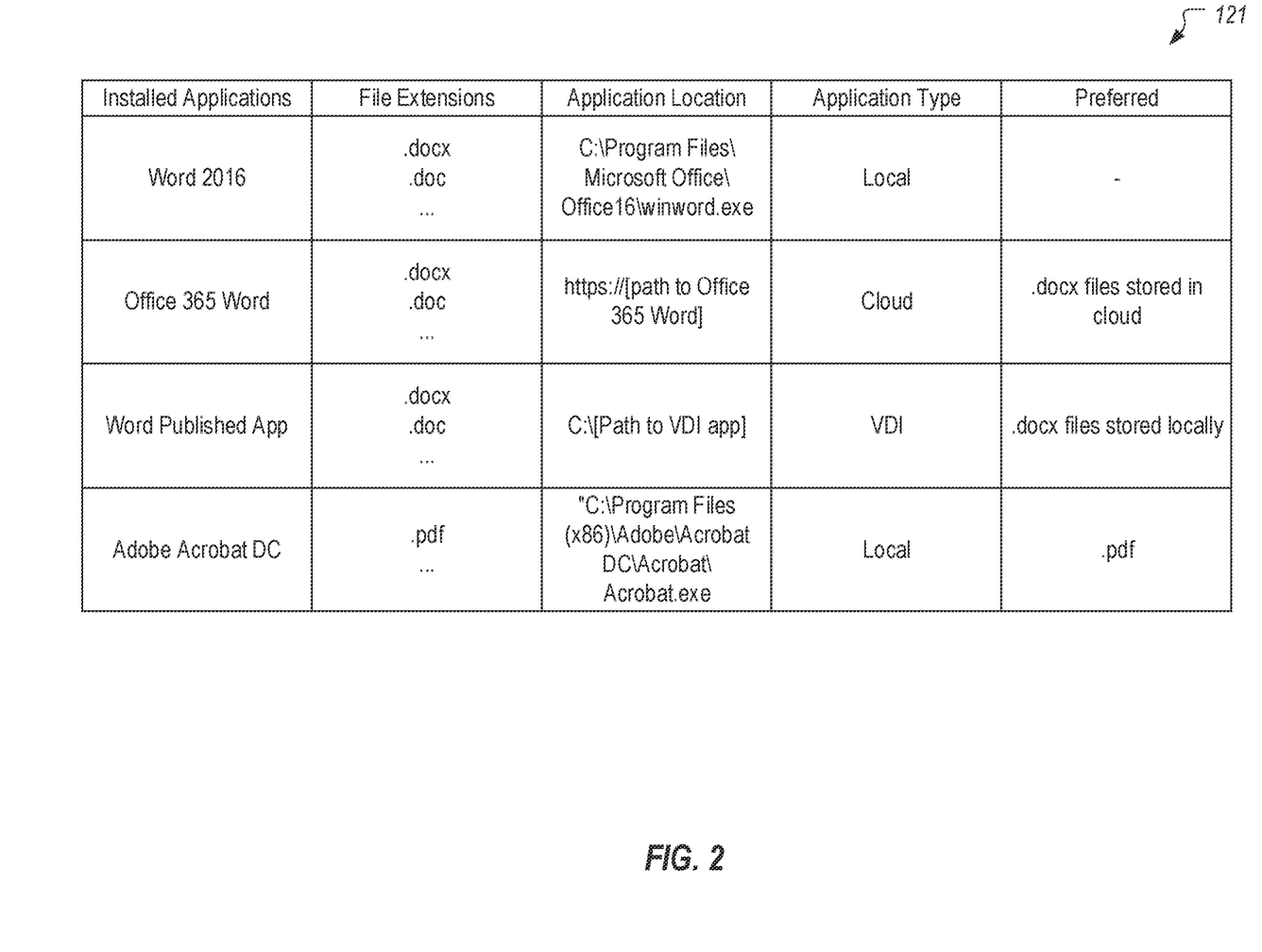
FIG. 2 provides an example of a database that may be employed in one or more embodiments of the present invention.

FIG. 2 provides an example of how dynamic application selection database 121 may be configured in one or more embodiments of the present invention. As shown, dynamic application selection database 121 can identify each application that is installed or available on computing device 100, the file extensions that each of these applications can handle, a location of the applications (e.g., a path to the executable of a locally installed application, a web-based path/commands to a cloud application, a path/commands to a published application, etc.), a type of the applications (e.g., local, cloud or VDI) and any preferences defined for the applications (e.g., certain file types and/or file locations for which an application is preferred).

In some embodiments, to populate at least some of the information contained in dynamic application selection database 121, application broker service 120 (e.g., a thread of application broker service 120) may be configured to search for and identify all applications that are installed/available on computing device 100 and determine which file extensions the applications can open. For example, application broker service 120 could periodically identify locally installed applications (e.g., by accessing the registry or other data structures), VDI applications (e.g., by identifying RDP, Citrix and Horizon published applications), and cloud applications (e.g., by determining whether One Drive or Google Drive is installed). In some embodiments, preferences could be defined/populated via agent 140 (e.g., by an administrator and/or in accordance with a policy). In some embodiments, a user could define preferences. In some embodiments, application broker service 120 could determine preferences based on a user's interactions with the applications, file types, file locations, etc.

FIGS. 3A-3D provide an example of how application broker service 120 can dynamically select an application to open a file. In this example, it is assumed that overlay 130 is configured to intercept requests to open files by hooking calls to the CreateProcess function. However, overlay 130 could also intercept requests to open files in any other suitable manner.

Figure 3A:
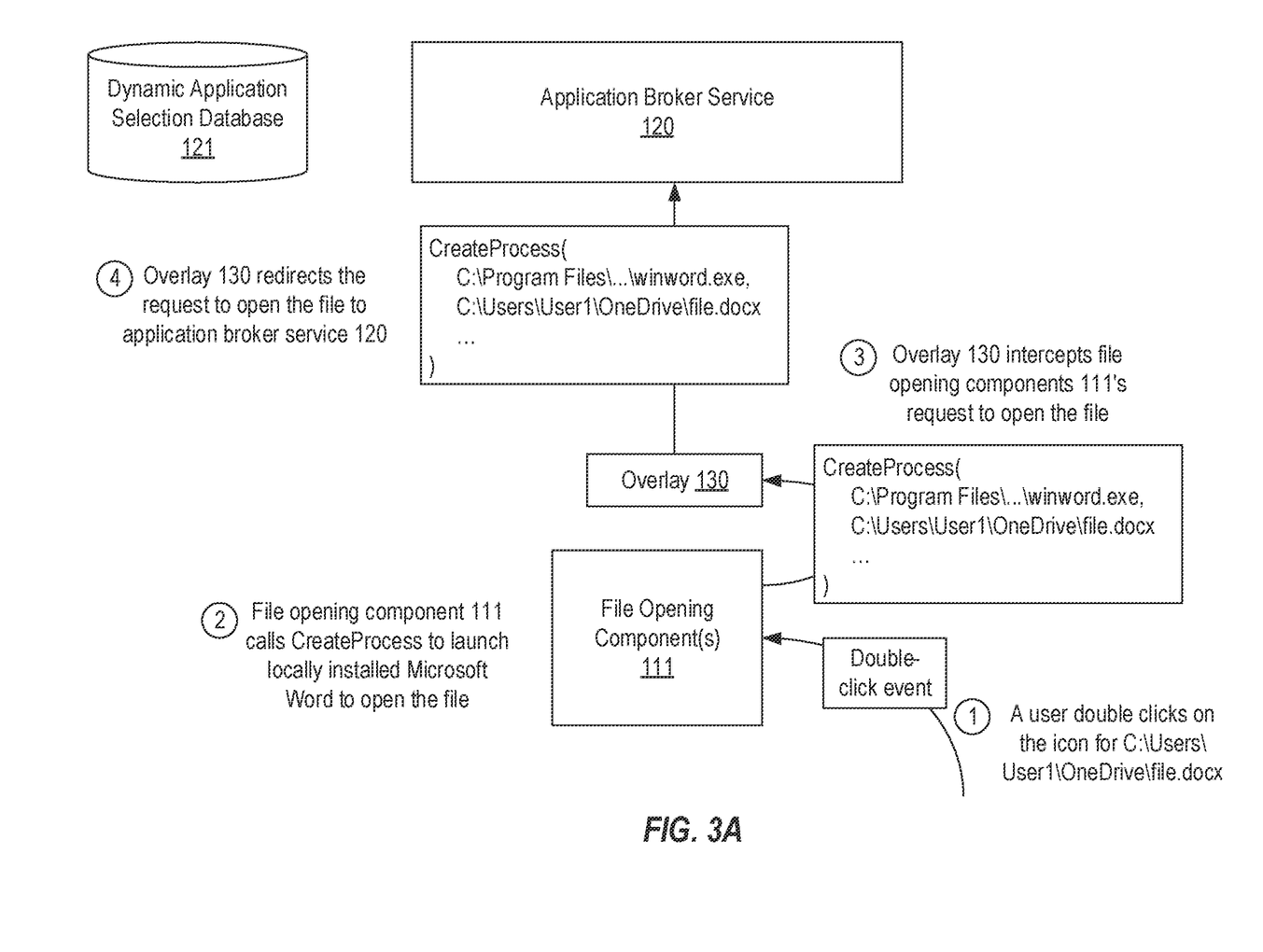
FIGS. 3A-3D provide an example of how an application can be dynamically selected to open a file.

Turning to FIG. 3A, in step 1, it is assumed that a user double clicks on an icon for a file named file.docx stored in the OneDrive folder (C:\Users\User1\OneDrive\file.docx). In response to the double click event, in step 2, file opening component 111 could call the CreateProcess function and specify the default application for .docx files, which is assumed to be C:\ProgramFiles\ . . . \winword.exe, and the path and name of the file (C:\Users\User1\OneDrive\file.docx) as a command line argument for the default application. In other words, this call to the CreateProcess function would cause the locally installed Microsoft Word to be launched to open the file absent the techniques described herein.

In step 3, overlay 130 can intercept file opening component 111's request to open the file, which in this case is accomplished by hooking the CreateProcess function. In particular, the hook can cause overlay 130 to be invoked to initially handle the call to the CreateProcess function before it is handled by operating system 110. In step 4, overlay 130 can redirect the request to open the file to application broker service 120. This redirection can be accomplished in any suitable manner such as by enabling application broker service 120 to access the parameters specified in the call to the CreateProcess function.

Figure 3B:
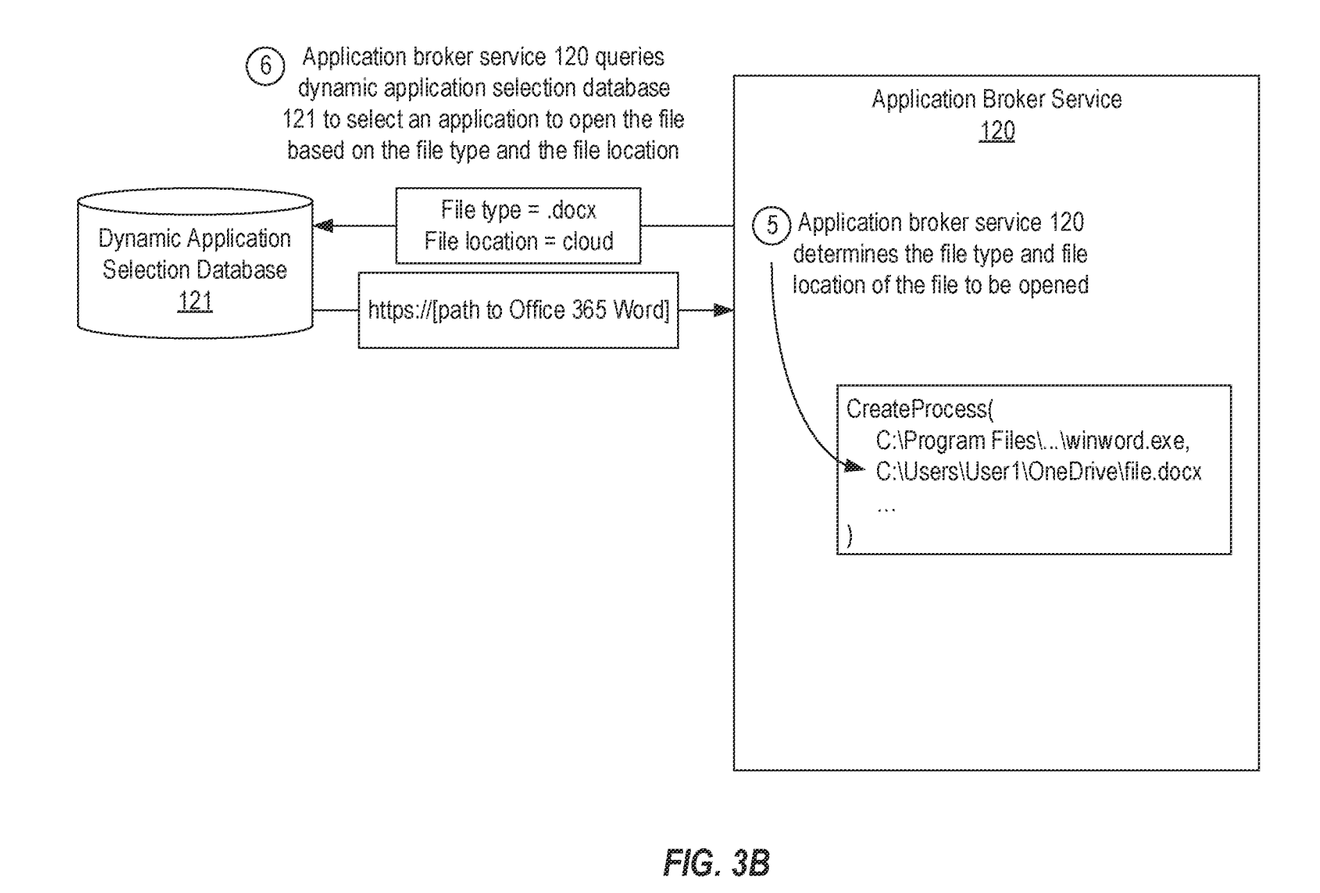

Turning to FIG. 3B, in step 5, application broker service 120 can process the request to open the file to determine the file type and/or the file location of the file to be opened. For example, application broker service 120 could determine that the file type is .docx and that the file location is in the cloud (e.g., that the file stored in the OneDrive folder is also stored in the cloud). In step 6, application broker service 120 can query dynamic application selection database 121 to select an application to open the file based on the file type and/or the file location. With reference to FIG. 2, as a result of step 6, application broker service 120 may determine that Office 365 Word, as opposed to the locally installed version of Word, is the preferred application for .docx files that are stored in the cloud. As represented in FIG. 3B, and as part of this determination, application broker service 120 may retrieve the application location for the selection application. In the case of a cloud application, this application location could be in the form of a URL.

Figure 3C:
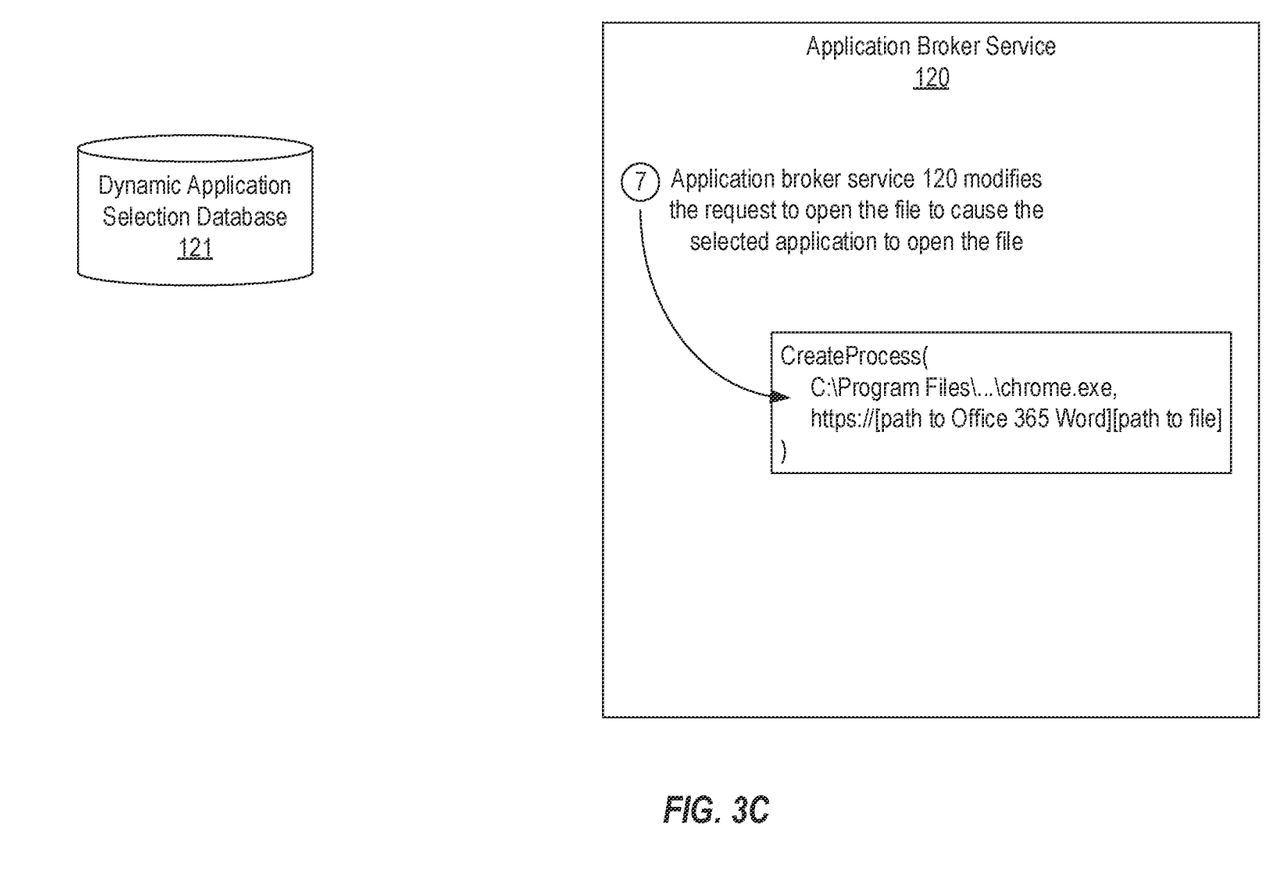

Turning to FIG. 3C, once it has selected the application to open the file, in step 7, application broker service 120 can modify the request to open the file (or create a different request) to cause the selected application to open the file as opposed to the application (e.g., the default application) that filing opening component 111 specified. In this example, this may entail specifying a browser as the application to be launched by the call to the CreateProcess function and specifying a URL that identifies Office 365 Word and the file to be opened (e.g., using a unique identifier of the file within OneDrive). In some embodiments, as part of opening a file, application broker service 120 may authenticate the user if necessary. For example, when opening a file stored in the cloud or on a shared drive, application broker service 120 may obtain credentials (e.g., credentials of the logged in user, credentials from a configuration file, credentials for an external identity, etc.) to perform any authentication that may be required to open the file using the selected application.

Figure 3D:
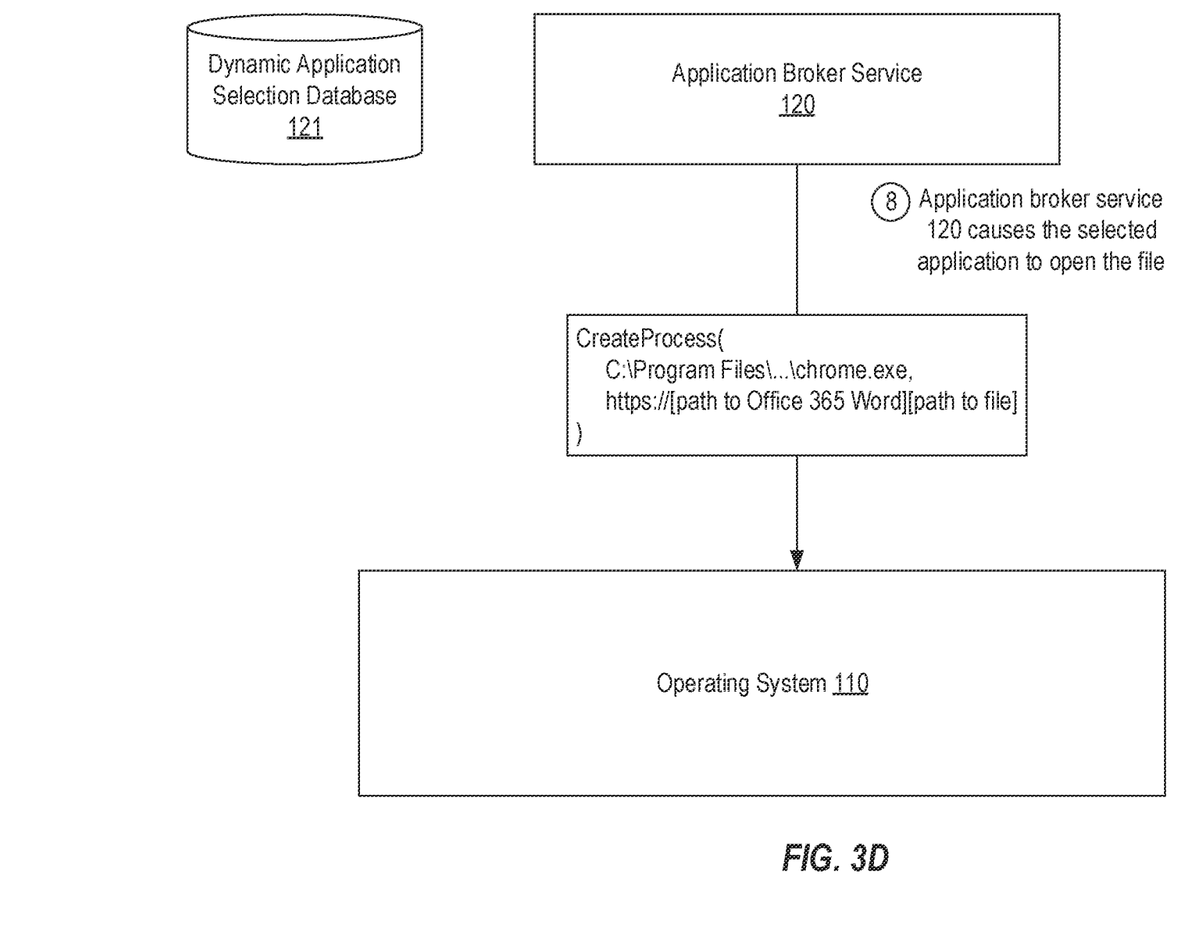

Turning to FIG. 3D, in step 8, application broker service 120 can cause the selected application to open the file. For example, application broker service 120 could allow the call to the CreateProcess function, as modified, to be passed to and handled by operating system 110. Operating system 110 can notify application broker service 120 whether the call completes successfully. If it does not, or if the file otherwise fails to be opened, application broker service 120 can again access dynamic application selection database 121 to select another application to be launched to open the file. With reference to FIG. 2, application broker service 120 could select the Word published application or the locally installed version of Word and use the application location defined in dynamic application selection database 121 to launch the selected application. In such a case, application broker service 120 could specify the path and file name to a locally stored copy of the file (e.g., C:\Users\User1\OneDrive\file.docx) as a command line argument when launching the selected application.

Accordingly, in some embodiments, application broker service 120 can determine whether a file to be opened is stored in the cloud, and if so, can attempt to open the file using a cloud application. If the attempt to open the file in the cloud application is unsuccessful, application broker service 120 may attempt to open the file, assuming a copy of the file is available locally, using a local application or a VDI application. In some embodiments, application broker service 120 may attempt to open the file in a VDI application prior to attempting to open the file in a local application. Using these techniques, embodiments of the present invention can ensure that the user will not need to select an application to open a file and can ensure that the file will not fail to be opened.

It is reiterated that overlay 130 can function in various different ways to intercept a request to open a file and that application broker service 120's handling of the intercepted request will depend on how it is intercepted. For example, in some embodiments, overlay 130 may intercept a request to open a file before the CreateProcess function is called such as by intercepting an event or notification that is generated when a file icon is doubled clicked or otherwise selected. In such cases, application broker service 120 may create a call to the CreateProcess function as opposed to modifying a call that file opening component 111 may have made. Also, the CreateProcess function is used only as an example. Embodiments of the present invention should encompass any function call or similar functionality by which a particular application can be launched to open a file.

In summary, embodiments of the present invention may be implemented on a computing device to allow an application to be dynamically selected to open a file based on the location of the file and/or the type of the file. Embodiments of the present invention may also be implemented on a computing device so that multiple applications can be automatically and dynamically selected to open a file.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for dynamically selecting an application to open a file, the method comprising:
   in response to a user generating a request to open a first file on a computing device, intercepting the request at an overlay;
   redirecting, by the overlay, the request to open the first file to an application broker service;
   accessing, by the application broker service, the request to open the first file to identify:
   (1) a location where the first file is stored, and (2) a first application that the request specifies for opening the first file on the computing device;
   accessing, by the application broker service, a dynamic application selection database to determine that a second application is associated with the location where the first file is stored;
   based on the determination that the second application is associated with the location where the first file is stored, selecting, by the application broker service, the second application to open the file; and
   modifying the request to open the first file to specify the second application rather than the first application for opening the file; and
   in conjunction with modifying the request to open the first file, causing the request to open the first file to be further processed to thereby request that an operating system of the computing device cause the first file to be opened in the second application rather than the first application.

2. The method of claim 1, wherein the first application is a default application.

3. The method of claim 1, wherein the location where the first file is stored comprises the cloud and the second application is a cloud application.

4. The method of claim 1, wherein the location where the first file is stored comprises local storage and the second application is a VDI application.

5. The method of claim 1, wherein the location where the first file is stored comprises local storage and the second application is a local application.

6. The method of claim 1, wherein the application broker service selects the second application based also on determining that the second application is associated with a type of the first file.

7. The method of claim 1, further comprising:
   detecting that the first file failed to open in the second application;
   accessing, by the application broker service, the dynamic application selection database to determine that a third application is associated with either or both the location where the first file is stored or a type of the first file;
   selecting the third application to open the first file; and
   causing the third application to open the first file.

8. The method of claim 7, wherein the second application is a cloud application and the third application is a VDI application or a local application.

9. The method of claim 1, wherein the request to open the first file comprises a call to a function to create a process.

10. The method of claim 1, wherein the request to open the first file is generated in response to the user's interactions with a file explorer or a desktop.

11. A method for dynamically selecting an application to open a file, the method comprising:
    in response to a user generating a request to open a first file on a computing device, intercepting the request at an overlay;
    redirecting, by the overlay, the request to open the first file to an application broker service;
    accessing, by the application broker service, the request to open the first file to identify:
    (1) a location where the first file is stored, and (2) a first application that the request specifies for opening the first file on the computing device;
    accessing, by the application broker service, a dynamic application selection database to determine that a second application is associated with the location where the first file is stored;
    based on the determination that the second application is associated with the location where the first file is stored, selecting, by the application broker service, the second application to open the file;
    modifying the request to open the first file to specify the second application rather than the first application for opening the file;
    detecting that the first file failed to open in the second application; and
    causing the first file to be opened in a third application, the third application being associated with either or both the location where the first file is stored or a type of the first file.

12. The method of claim 11, wherein the third application is different from the first application.

13. The method of claim 11, wherein the second application is a cloud application and the third application is a VDI application or a local application.

14. The method of claim 11, wherein the second application is a VDI application and the third application is a local application.

15. The method of claim 11, wherein causing the first file to be opened in the third application comprises launching the third application.

16. The method of claim 11, wherein the first application is a default application for the type of the first file.

17. One or more computer storage media storing computer executable instructions which when executed implement a method for dynamically selecting an application to open a file, the method comprising:
    in response to a user generating a request to open a first file on a computing device, intercepting the request at an overlay;
    redirecting, by the overlay, the request to open the first file to an application broker service;
    accessing, by the application broker service, the request to open the first file to identify:
    (1) a location where the first file is stored, and (2) a first application that the request specifies for opening the first file on the computing device;
    accessing, by the application broker service, a dynamic application selection database to determine that a second application is associated with the location where the first file is stored;
    based on the determination that the second application is associated with the location where the first file is stored, selecting, by the application broker service, the second application to open the file;

modifying the request to open the first file to specify the second application rather than the first application for opening the file; and in conjunction with modifying the request to open the first file, causing the request to open the first file to be further processed to thereby request that an operating system of the computing device cause the first file to be opened in the second application rather than the first application.

18. The computer storage media of claim 17, wherein the location where the first file is stored comprises the cloud and the second application is a cloud application.

19. The computer storage media of claim 17, wherein the location where the first file is stored comprises local storage and the second application is a VDI application.

20. The computer storage media of claim 17, wherein the method further comprises:

detecting that the first file failed to open in the second application;

accessing, by the application broker service, the dynamic application selection database to determine that a third application is associated with either or both the location where the first file is stored or a type of the first file;

selecting the third application to open the first file; and causing the third application to open the first file.

\* \* \* \* \*